Dec. 4, 1934.  O. O. MANN ET AL  1,982,680
MACHINE FOR TREATING CORN STALKS
Filed July 30, 1932
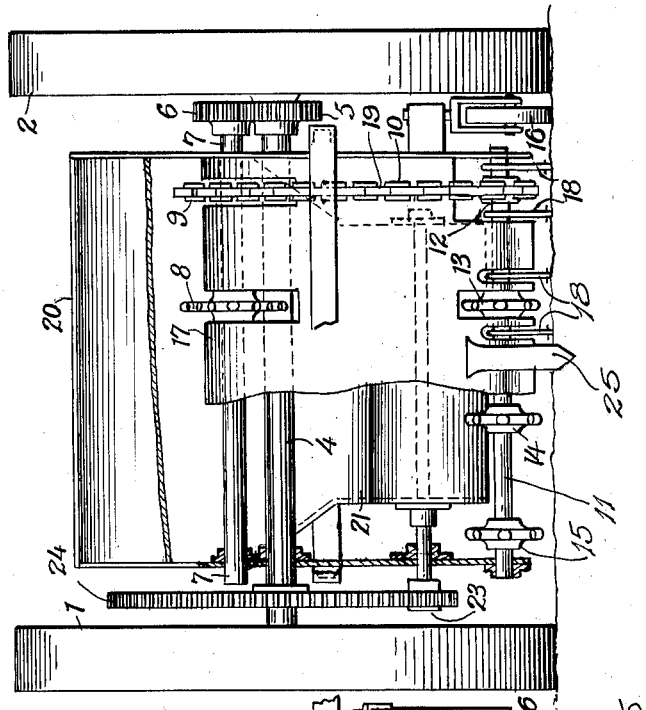
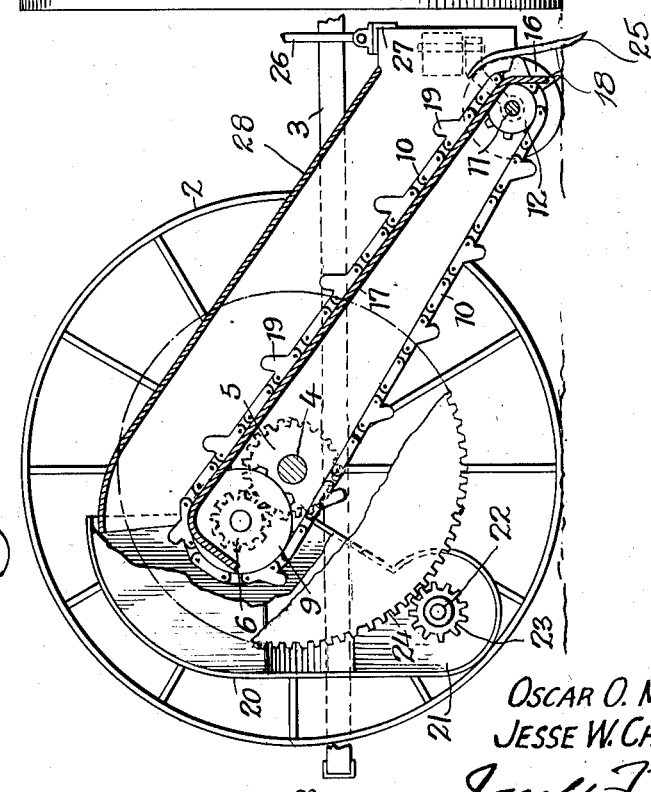
Inventor
OSCAR O. MANN,
JESSE W. CHENOWETH,
By
Attorney Patented Dec. 4, 1934

1,982,680

UNITED STATES PATENT OFFICE 1,982,680

MACHINE FOR TREATING CORN STALKS

Oscar O. Mann, Otterbein, and Jesse W. Chenoweth, Lebanon, Ind.

Application July 30, 1932, Serial No. 626,800

1 Claim. (Cl. 55—118)

This invention relates to the art of treating corn stalks which have been left on the field after harvesting the corn. Its object is to provide means for treating the stalks so as to insure the destruction of the corn borer and other similar insects which make their home in the stalks and at the same time to provide for so comminuting the stalks that they will be valuable as a humus on the ground to which they are returned after treatment and in a condition where they will not interfere with cultivation of the ground.

Other objects and advantages will become apparent as the description proceeds.

Referring to the drawing which is attached hereto and made a part hereof and on which similar reference characters indicate similar parts, Figure 1 is a side view in elevation with parts shown in section, and Figure 2 is a front elevation with parts shown in section to better illustrate their structure.

In carrying out the objects of the invention means are provided for gathering the corn stalks from the ground, conveying them to a suitable elevation and delivering them to suitable means by which they are ground, cut or pressed into a finely comminuted form and then delivered upon the ground where as a vegetable matter they contribute to the enrichment of the soil from which they were taken.

The machine consists of a suitable frame 3 which may be mounted upon an axle 4 having wheels 1 and 2. These wheels may be the usual drive wheels having driving projections to insure proper drive of the parts of the machine. The machine may be propelled in any suitable way as by horses or by tractor, as the condition of the ground may indicate as advisable. The axle 4 carries a pinion 5 which meshes with a gear 6 carried by a shaft 7. The shaft 7 extends across the machine and carries sprockets 8 and 9 about which travel elevator chains 10. A second shaft 11 is carried by supporting sides depending from the front of the frame and is positioned adjacent the ground. This shaft carries idle sprockets 12, 13, 14, and 15 over which the elevator chains travel. The front of the frame is carried by a pair of castor wheels 16, only one of which is shown. In their upward travel the elevator chains with prongs 19 rest upon a conveyor table 17 upon which they drag the corn stalks, and deliver them into a hopper 20. The shaft 11 carries a number of rake like teeth 18. These teeth are preferably loosely positioned in the shaft or some other support so as to be permitted freedom to move upward as they pass over uneven ground. The table 17 is provided with slots to permit the upward movement of these teeth 18. A hood 28 covers the table 17.

After being delivered into the hopper 20 the stalks fall into a reducing mill 21. This mill may be any suitable reducing mill having suitable projections for thoroughly grinding or mashing up the stalks. The grinding cylinder of the mill is mounted on a shaft. This shaft is driven from a gear 24 on the shaft 4 which gear meshes with a small pinion 23 on the shaft 22.

The front part of the machine is raised or lowered by means of a link 26 which is attached to a cross beam 27. The link 26 is carried by the main frame 3 in any suitable way. Any conventional or suitable seat may be provided.

While the mechanism has been shown as operated by the power by which propelled, it may be found advisable with very heavy stalks to provide other drive means for the mill. Obviously therefore a gasoline engine or other suitable power device may be operably connected to drive the elements.

In order to assist in digging out roots and stumps of the stalks a single larger tooth 25 may be provided which is somewhat in advance of the rake teeth. This tooth will follow the corn row and uproot the stumps which will be gathered up by the conveyor and ground up along with the stalks, thus further insuring destruction of the borers and rendering the stumps into a shape in which they will not interfere with cultivation but will scatter out and serve as humus on the soil.

It will be obvious to those skilled in the art that various changes may be made in the form of our invention without departing from the spirit thereof, we therefore do not limit ourselves to the invention as shown in the drawing and described in the specification but only as stated in the appended claim.

Having fully described our said invention what we claim as new and desire to secure by Letters Patent is:

A machine of the kind described comprising a frame having an axle journalled therein, a shaft mounted in said frame, and parallel with said axle, means for driving said shaft from said axle, a plurality of driving sprockets secured on said shaft, a pair of casters supporting the front of said frame, supports depending from the front of said frame, a second shaft supported in said supports, a plurality of sprockets on each of said shafts, a conveyor chain carried on said sprockets, a grinding mill, a gear on said axle operably connected to said mill for driving the same, a plurality of rake teeth carried at the front of said frame and a single digger tooth positioned in advance of the rake teeth.

OSCAR O. MANN.
JESSE W. CHENOWETH.